(12) United States Patent
Muldoon et al.

(10) Patent No.: US 12,166,212 B2
(45) Date of Patent: Dec. 10, 2024

(54) INTERPHASE BETWEEN LITHIUM METAL AND SOLID ELECTROLYTE

(71) Applicant: Toyota Motor Engineering & Manufacturing North America, Inc., Erlanger, KY (US)

(72) Inventors: John Muldoon, Saline, MI (US); Patrick J. Bonnick, Ann Arbor, MI (US); Koji Suto, Ann Arbor, MI (US); Timothy S. Arthur, Ann Arbor, MI (US); Erika Nagai, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 18 days.

(21) Appl. No.: 15/885,417

(22) Filed: Jan. 31, 2018

(65) Prior Publication Data

US 2019/0221851 A1    Jul. 18, 2019

Related U.S. Application Data

(60) Provisional application No. 62/616,544, filed on Jan. 12, 2018.

(51) Int. Cl.
*H01M 4/62* (2006.01)
*H01M 4/02* (2006.01)
(Continued)

(52) U.S. Cl.
CPC ........... *H01M 4/628* (2013.01); *H01M 4/134* (2013.01); *H01M 4/1395* (2013.01);
(Continued)

(58) Field of Classification Search
CPC .... H01M 4/628; H01M 4/366; H01M 10/052; H01M 4/382; H01M 10/0585; H01M 4/1395; H01M 4/134; H01M 2004/027
(Continued)

(56) References Cited

U.S. PATENT DOCUMENTS 8,262,747 B2    9/2012  Ooyama et al.
2011/0059339 A1    3/2011  Yamasaki et al.
(Continued)

FOREIGN PATENT DOCUMENTS

CN    103618090 B    3/2016
JP    H06310174 A * 4/1993
(Continued)

OTHER PUBLICATIONS

Huang et al., Protecting Li-Metal Anode in a Li—O2 Battery by using Boric Acid as an SEI-Forming Additive, 2018, Advanced Materials, 30, 1803270, pp. 1-6 (Year: 2018).*
(Continued)

*Primary Examiner* — Christian Roldan
(74) *Attorney, Agent, or Firm* — Oblon, McClelland, Maier & Neustadt, L.L.P.

(57) ABSTRACT

A lithium metal electrode having an artificial interphase layer is provided. The artificial interphase layer conducts lithium ions but is nonconductive of electrons. A method to prepare the lithium metal electrode is also provided. A solid state electrochemical cell containing the lithium metal electrode is provided. A solid state lithium-sulfur electrochemical cell is provided which has a sustained discharge capacity of about 3 mAh/cm$^2$.

13 Claims, 14 Drawing Sheets

(51) Int. Cl.
   *H01M 4/134*     (2010.01)
   *H01M 4/1395*    (2010.01)
   *H01M 4/36*      (2006.01)
   *H01M 4/38*      (2006.01)
   *H01M 10/052*    (2010.01)
   *H01M 10/0585*   (2010.01)

(52) U.S. Cl.
   CPC .......... *H01M 4/366* (2013.01); *H01M 4/382* (2013.01); *H01M 10/052* (2013.01); *H01M 10/0585* (2013.01); *H01M 2004/027* (2013.01)

(58) Field of Classification Search
   USPC ......................................................... 429/215
   See application file for complete search history.

(56) References Cited

U.S. PATENT DOCUMENTS

| | | | |
|---|---|---|---|
| 2011/0117437 A1 | 5/2011 | Watanabe et al. | |
| 2015/0084604 A1* | 3/2015 | Thillaiyan | H01M 50/46 320/162 |
| 2015/0210557 A1* | 7/2015 | Song | H01M 4/525 429/223 |
| 2016/0056436 A1* | 2/2016 | Haruna | H01M 50/406 429/126 |
| 2016/0260963 A1* | 9/2016 | Suzuki | H01M 10/0562 |
| 2016/0380314 A1* | 12/2016 | Yang | H01M 2/1653 429/231.95 |
| 2017/0084953 A1* | 3/2017 | Smith | H01M 10/0567 |
| 2018/0151914 A1* | 5/2018 | Zimmerman | H01M 4/505 |

FOREIGN PATENT DOCUMENTS

| | | | |
|---|---|---|---|
| JP | H07296851 A | * | 4/1994 |
| JP | 6-310174 | | 11/1994 |
| JP | 7-296851 | | 11/1995 |
| JP | 2003151559 | * | 5/2003 |
| JP | 2012142101 A | * | 12/2010 |
| JP | 2012-142101 | | 7/2012 |
| JP | 5919942 B2 | | 5/2016 |
| KR | 100502319 B1 | | 9/2005 |

OTHER PUBLICATIONS

A) Analysis Features. Depth Profiling. 2013-2021. Thermofisher Scientific. (Year: 2013).*
Weishang et al., Pretreatment of Lithium Surface by using Iodic Acid (HIO3) to Improve its Anode Performance in Lithium Batteries, ACS Publications, Applied Materials & Interfaces 2017, 9, 7068-7074. (Year: 2017).*
Nian-Wu et al., An Artificial Solid Electrolyte Interphase Layer for Stable Lithium Metal Anodes, Material Views, Advanced Matters, 2016, 28, 1853-1858. (Year: 2016).*
Younesi et al., Lithium salts for advanced lithium batteries, Li-metal, Li-O2, and Li-S, Energy & Environmental Science, Royal Society of Chemistry, 2015, 8, pp. 1905-1922. (Year: 2015).*
Liao et al., A survey of methods for monitoring and detecting thermal runway of lithium-ion batteries, Elsevier, Journal of Power Sources, 436, 2019, 226879, pp. 1-19. (Year: 2019).*
Y. Wu et al., "High Capacity, Surface-Modified Layered Li[Li$_{(1-x)/3}$Mn$_{(2-x)/3}$Ni$_{x/3}$Co$_{x/3}$]O$_2$ Cathodes with Low Irreversible Capacity Loss", Electrochemical and Solid-State Letters 9(5):A221-A224 (2006).
S.-H. Kang et al., "The Effects of Acid Treatment on the Electrochemical Properties of 0.5 Li$_2$MnO$_3$·0.5 LiNi$_{0.44}$CO$_{0.25}$Mn$_{0.31}$O$_2$ Electrodes in Lithium Cells", J. Electrochemical Society, 153(6):A1186-A1192 (2006).
Seong Jin An, et al., "The State of Understanding of the Lithium-Ion-Battery Graphite Solid Electrolyte Interphase (SEI) and its Relationship to Formation Cycling", *Carbon*, 105 (2016) pp. 52-76.
Jing Yu et al., "Progress and Perspective of Constructing Solid Electrolyte Interphase on Stable Lithium Metal Anode" *Frontiers in Materials*, Mar. 2020, vol. 7, Article 71, pp. 1-7.
Office Action mailed Feb. 14, 2023, in Japanese Patent Application No. 2019-004700 (with English-language Translation). (References 15, 16 and 17 are cited therein).
Office Action issued Nov. 8, 2023, in Chinese Patent Application No. 201910032381.4 (with English-language Translation). (References 24 and 25 are cited therein).
Weishang, Jia, et al., "Pretreatment of Lithium Surface by Using Iodic Acid (HIO3) to Improve Its Anode Performance in Lithium Batteries", *ACS Appl. Mater. Interfaces*, 2017, (9), 7068-7074 (with attached Supporting Information).
Nian-Wu Li, et al., "An Artificial Solid Electrolyte Interphase Layer for Stable Lithium Metal Anodes," *Adv. Mater.*, 2016 (28), 1853-1859 (with attached Supporting Information).

* cited by examiner

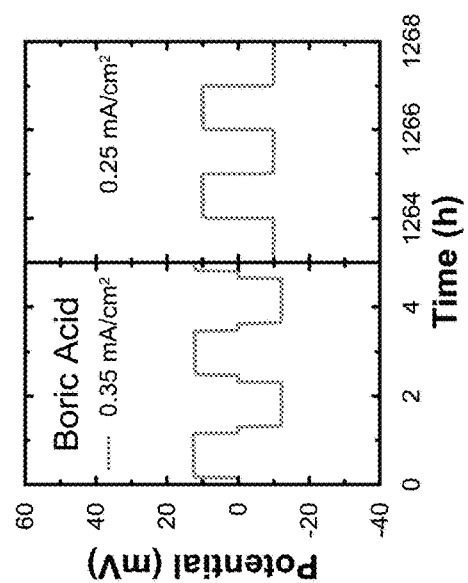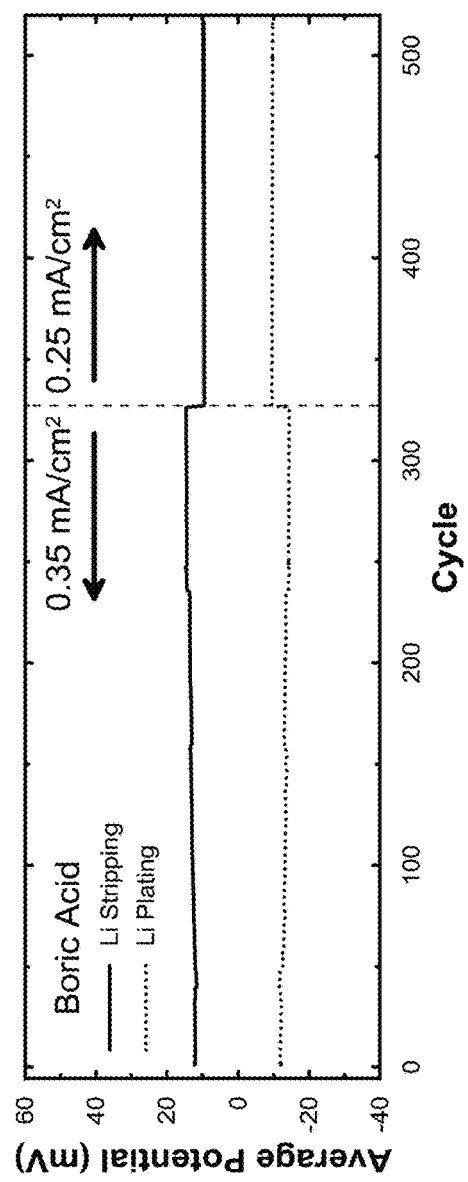
FIG. 4A
FIG. 4B

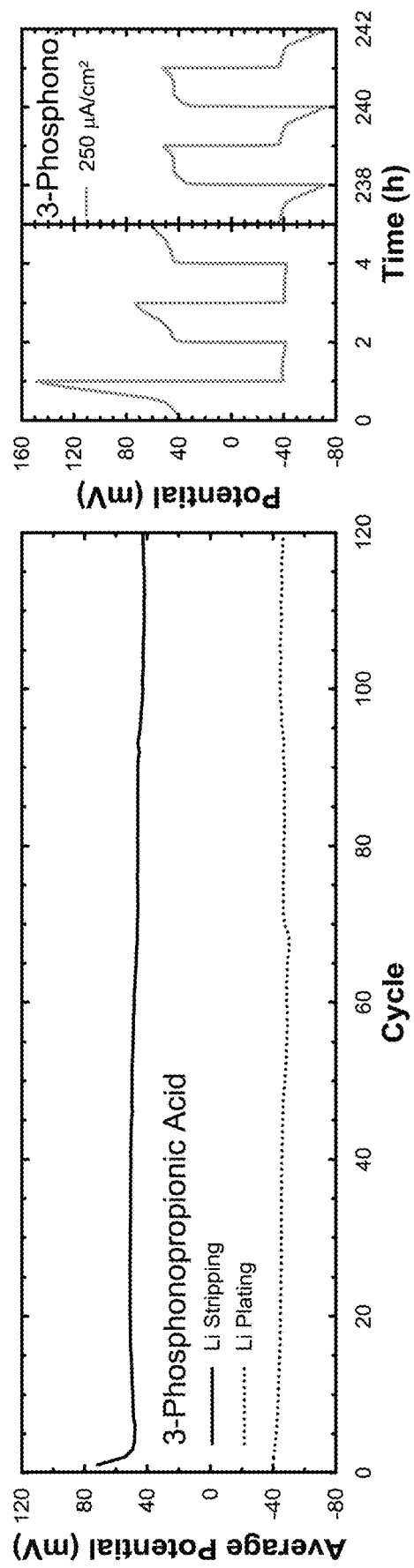
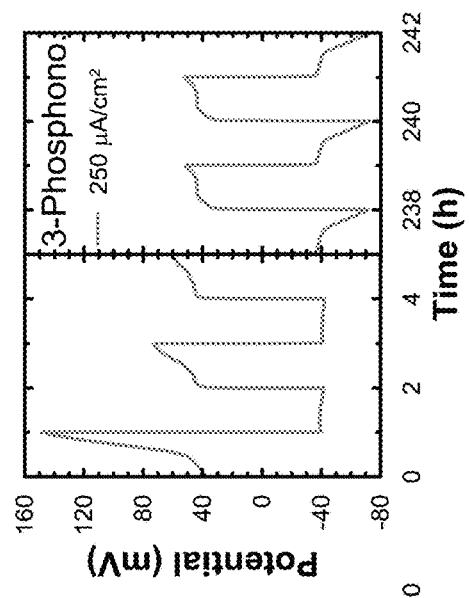
FIG. 7A
FIG. 7B

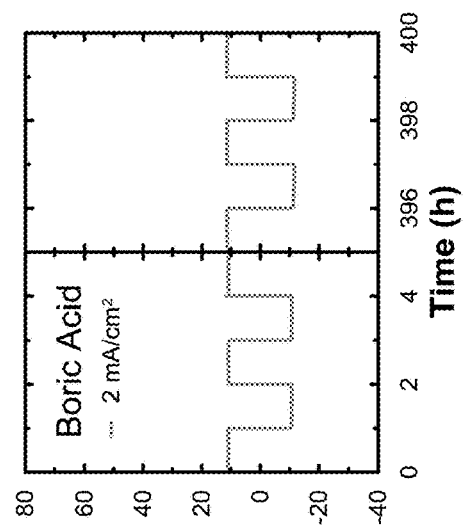
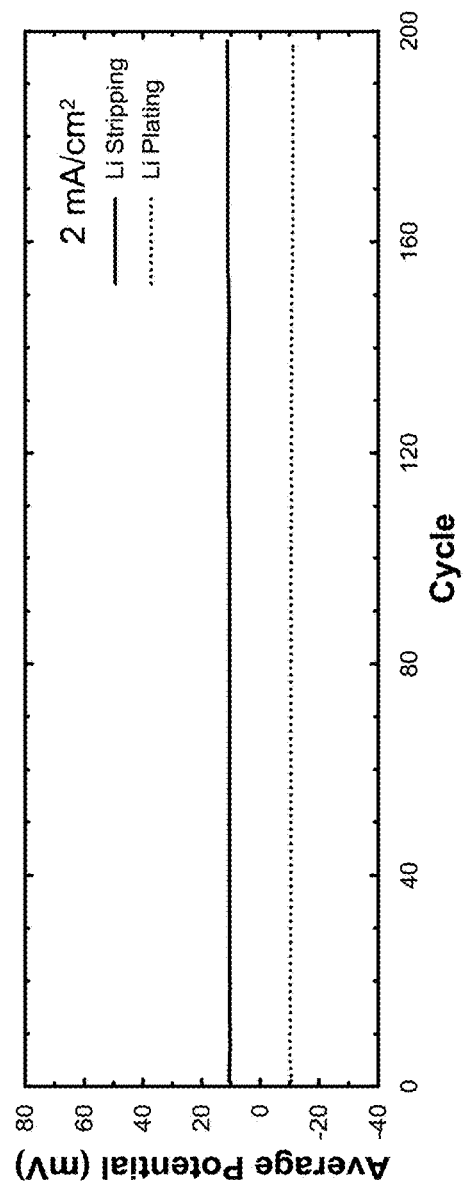
FIG. 9B
FIG. 9A

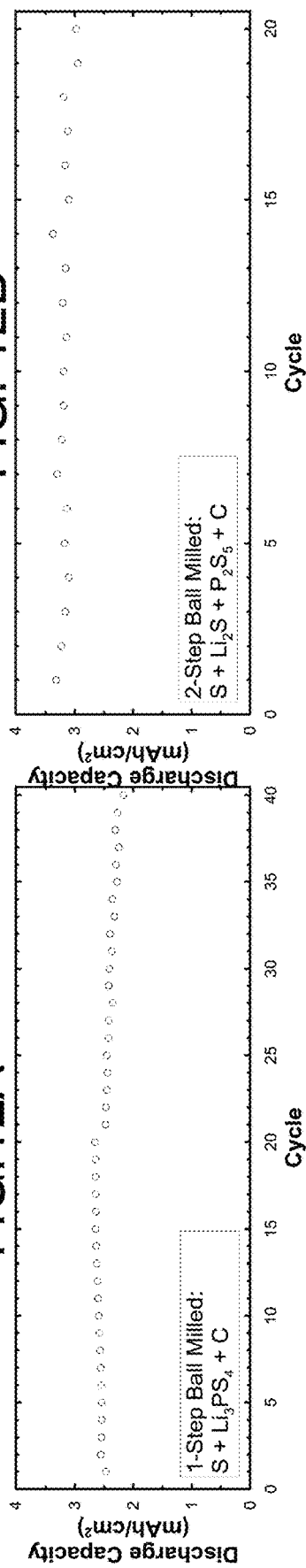
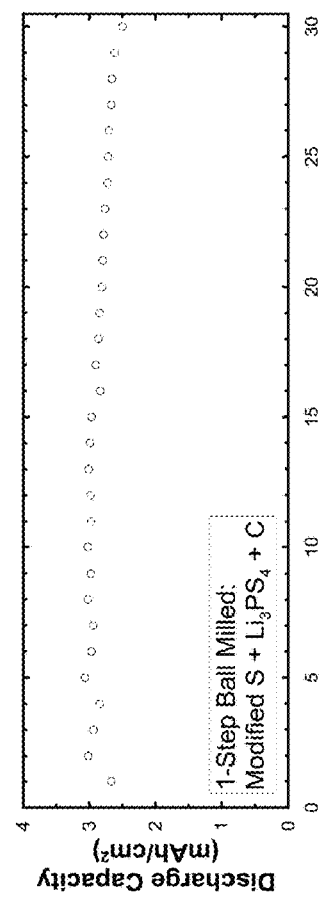
FIG. 12A / FIG. 12B / FIG. 12C
Solid Li-S Cycling

INTERPHASE BETWEEN LITHIUM METAL AND SOLID ELECTROLYTE

FIELD OF THE DISCLOSURE

This disclosure is directed to lithium metal solid state batteries having an interphase between the lithium metal surface of the anode and the adjacent surface of the solid state electrolyte. The purpose of the interphase is to inhibit reductive decomposition of the solid electrolyte by the highly reductive lithium metal. Such a stabilized lithium metal electrode may be the basis for an all solid state battery.

DISCUSSION OF THE BACKGROUND

Batteries using a lithium metal negative electrode are the subject of battery research in many organizations due to the extremely high specific capacity of 3,860 mAh/g and the low reduction potential of −3.04 V vs the standard hydrogen electrode of lithium metal. Due to this low reduction potential, conventional solid state electrolytes such as for example, lithium thiophosphates decompose when exposed to and in contact with lithium metal.

Additionally, as a result of the reactivity of lithium metal with gases such as $CO_2$, $N_2$ and $O_2$, lithium metal is easily compromised by formation of a layer of lithium salts on the metal surface. Examples of such salts include $Li_2CO_3$, $Li_3N$ and LiOH as $Li_2O$. Due to the presence of such salts on the lithium electrode surface a non-uniform current distribution across the lithium electrode surface is obtained and as a result, lithium is unevenly plated in the charge process and dendrite formation takes place.

Sulfur is very attractive as a positive electrode material because it is very cheap and has a high specific capacity of 1,672 mAh/g. However, the development of commercially viable lithium sulfur batteries has to date been inhibited by several major challenges, most notably the dissolution of lithium polysulfides into the liquid electrolyte during the reduction of sulfur and the dendritic growth of lithium during charging. These challenges are described for example in the article by P. Bonnick, E. Nagai and J. Muldoon, J. Electrochem. Soc., vol 165, issue 1, A6005-A6007 (2018). Most researchers who have explored lithium-sulfur all solid state battery have used a lithium alloy negative electrode having a reduction potential sufficiently high to avoid the decomposition of the solid electrolyte. One example of a lithium alloy is lithium-indium as described by T. Hakari, A. Hayni, M. Tasumisago, Adv. Sustainable Syst., 1700017 (2017). Unfortunately, using a higher reduction potential negative electrode decreases the voltage and energy output capacity of the battery. A review on solid electrolyte is provided by A. Manthiram, X. Yu and S. Wang, Nature Reviews|Materials, vol 2, 16103 (2017). Beginning on page 7, this review provides a discussion of lithium sulfur on page 7 and references therein.

One approach to overcome the challenge of lithium polysulfide dissolution described above is to use a solid electrolyte in place of a liquid electrolyte. One solid electrolyte of great interest is based on a lithium thiophosphate composite as described by R Garcia-Mendez, F Mizuno, R Zhang, T S Arthur, J Sakamoto, Electrochimica Acta, vol 237, pg. 144-151 (2017). As stated in this paper it is crucial to prevent the decomposition of lithium thiophosphates on the lithium metal surface in order to prevent formation of a highly resistive between the lithium metal and the solid electrolyte.

Therefore, there is a need for a structure or system to prevent reductive decomposition of electrolytes, especially a solid electrolyte by a lithium metal electrode. More specifically there is a need for a structure or system to prevent the decomposition of lithium thiophosphate solid electrolytes by a lithium metal electrode. Further, there is a need for high capacity lithium electrochemical cells, especially electrochemical cells containing elemental sulfur as a cathode active material.

SUMMARY OF THE DISCLOSURE

These and other objects are addressed by the present disclosure, the first embodiment of which provides a lithium electrode of a lithium metal having a surface layer being an artificial interphase layer, comprising salts and/or compounds resulting from reaction of lithium metal and an acid dissolved in a nonaqueous solvent wherein the artificial interphase layer conducts lithium ions and is nonconductive of electrons.

In an aspect of the first embodiment, a depth of the artificial interphase layer is from 1 nm to 1000 nm.

In another aspect of the first embodiment, the acid is an organic acid or an inorganic acid. In a special aspect of the first embodiment, the acid is one selected from the group consisting of boric acid, sulfamic acid, ascorbic acid and 3-phosphonopropionic acid.

In a second embodiment, the present disclosure provides an electrochemical cell, comprising: a lithium metal anode; a cathode capable of absorbing and release of lithium ions; and a non-aqueous electrolyte arranged between the lithium metal anode and the cathode; wherein an artificial interphase layer is located between the non-aqueous electrolyte and the lithium metal anode, the artificial interphase layer comprises salts and/or compounds resulting from reaction of lithium metal and an acid dissolved in a nonaqueous solvent, and the artificial interphase layer conducts lithium ions and is nonconductive of electrons.

In an aspect of the second embodiment, a depth of the artificial interphase layer is from 1 nm to 1000 nm.

In another aspect of the second embodiment, the acid is an organic acid or an inorganic acid and in a further aspect, the acid is one selected from the group consisting of boric acid, sulfamic acid, ascorbic acid and 3-phosphonopropionic acid.

In a third embodiment, the present disclosure provides a solid state electrochemical cell, comprising: a lithium metal anode; a cathode capable of absorbing and release of lithium ions; and a solid state electrolyte arranged between the lithium metal anode and the cathode; wherein an artificial interphase layer is located between the solid electrolyte and the lithium metal anode, the artificial interphase layer comprises salts and/or compounds resulting from reaction of lithium metal and an acid dissolved in a nonaqueous solvent, and the artificial interphase layer conducts lithium ions and is nonconductive or electrons.

In an aspect of the third embodiment, a depth of the artificial interphase layer is from 1 nm to 1000 nm.

In another aspect of the third embodiment, the acid is an organic acid or an inorganic acid and in a further aspect, the acid is one selected from the group consisting of boric acid, sulfamic acid, ascorbic acid and 3-phosphonopropionic acid.

In a special aspect of the third embodiment, the cathode capable of absorbing and release of lithium ions comprises elemental sulfur and in a specialized aspect, the cathode further comprises selenium and/or tellurium.

In a further special aspect of the third embodiment, the solid electrolyte is a lithium thiophosphate solid electrolyte and further, the lithium thiophosphate may be doped with a lithium salt selected from the group consisting of LiF, LiCl, LiBr, LiI, $Li_3N$, $Li_3P$, $Li_2O$, $Li_3BO_3$ and $LiBH_4$.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A shows the long term cycling of a Li—Li symmetric cell using lithium iodide-doped lithium thiophosphate solid electrolyte and lithium metal electrodes which were treated with boric acid in DMSO solvent according to one embodiment.

FIG. 413 shows the first and last cycles from FIG. 4A.

FIG. 7A shows the long term cycling of a Li—Li symmetric cell using lithium iodide-doped lithium thiophosphate solid electrolyte. The lithium metal electrodes were treated with 3-phosphonopropionic acid in DMSO solvent prior to testing. The average snipping and plating potentials are stable through cycling, but FIG. 7B shows that the potential profile changes between the first and final cycles. The identical profile in sequential cycles suggests that a reversible process occurs in the interphase.

FIG. 9A shows the long term cycling at 2 $mA/cm^2$ of a Li—Li symmetric cell using lithium iodide-doped lithium thiophosphate solid electrolyte and lithium metal electrodes which were treated with boric acid in DMSO solvent according to one embodiment.

FIG. 9B shows the potential profiles of the first and final cycles of FIG. 9A.

FIG. 12A shows the cycling behavior of the same positive electrode of FIG. 11A, and a lithium negative electrode which was treated with boric acid according to the embodiments of the disclosure.

FIG. 12B shows the cycling behavior of the same positive electrode of FIG. 11B, and a lithium negative electrode which was treated with boric acid according to the embodiments of the disclosure.

FIG. 12C shows the cycling behavior of the same positive electrode of FIG. 11C, and a lithium negative electrode which was treated with boric acid according to the embodiments of the disclosure.

DETAILED DESCRIPTION OF THE PREFERRED EMBODIMENTS

Throughout this description the term "artificial interphase" is employed to describe the interphase obtained by treatment of the lithium metal electrode according to the embodiments described herein. In contrast, the term "natural interphase" describes an interphase shown to develop at a solid electrolyte surface-lithium electrode surface boundary when run through electrochemical cycling. In the case of a lithium metal electrode and a lithium halide doped lithium thiophosphate a natural interphase containing $Li_3P$, $Li_2S$ and lithium halide is formed.

The term electrochemical cell unless otherwise defined may be interpreted broadly to mean a simple test cell or to mean a structure of a battery.

As used herein, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted. All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The applicants are involved in an ongoing study with the target of developing lithium-sulfur batteries having sufficient voltage and energy capacity to be commercially viable. As part of the ongoing study development of solid state lithium-sulfur batteries was targeted due to potential energy capacity and relative economic advantage of sulfur as a cathode active material. A solid electrolyte offers a potential solution to the challenge presented by sulfide dissolution in a liquid electrolyte described above.

Figure 1:
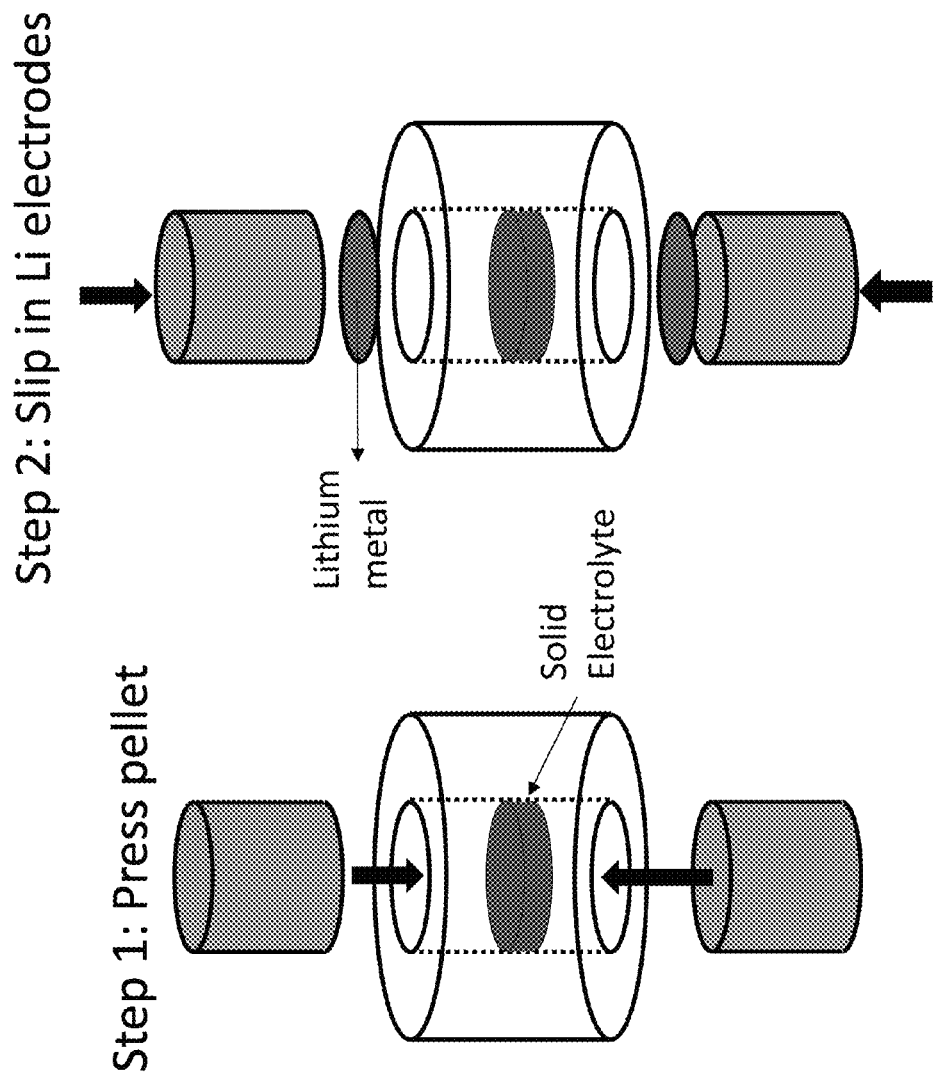
FIG. 1 shows a symmetric cell design and assembly for testing interphases on lithium metal electrodes.
Figure 2B:
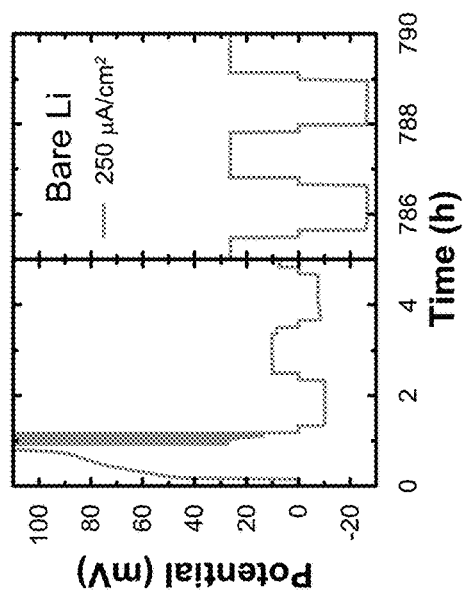
FIG. 2B shows the first and last cycles from FIG. 2A.
Figure 2A:
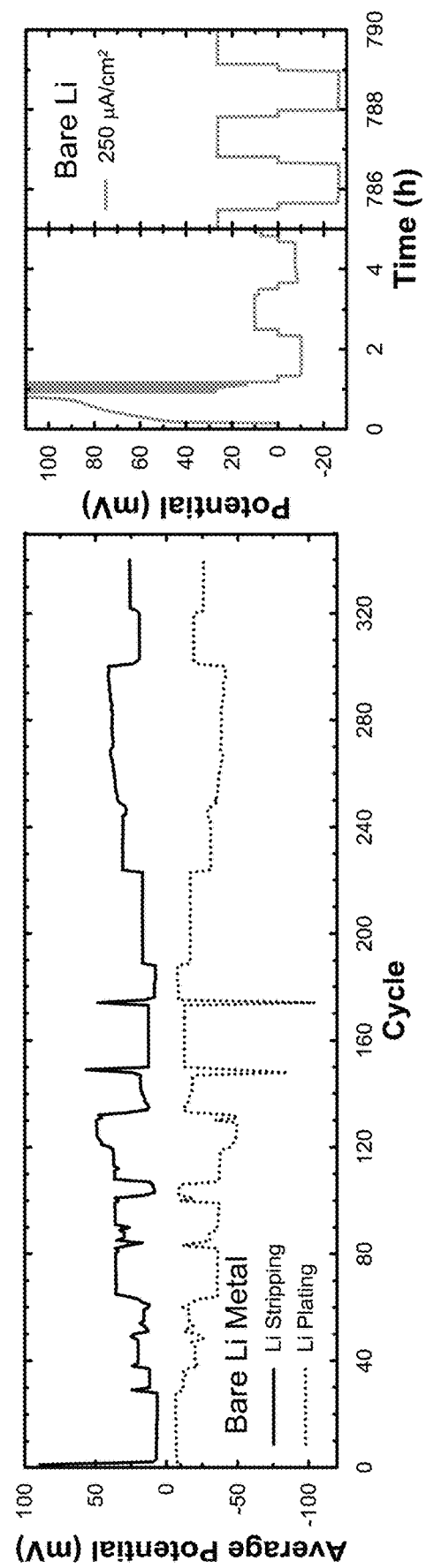
FIG. 2A shows the long term cycling of a Li—Li symmetric cell using lithium iodide-doped lithium thiophosphate solid electrolyte and lithium metal electrodes which were not treated according to the embodiments of the disclosure.

In this ongoing development of solid state systems, symmetric lithium cells as shown in FIG. 1 were prepared and employed to evaluate performance of test solid state systems. Description of the method to prepare the symmetric cells is provided in the Experimental section. FIG. 2A shows the long term cycling of a Li—Li symmetric cell using a lithium halide-doped lithium thiophosphate solid electrolyte. The lithium metal electrodes were not treated prior to testing. As indicated in FIG. 2A, the stripping and plating potentials are not stable through cycling, similar to reports from the literature [Garcia-Mendez et al., DOI: 10.1016/j.electacta.2017.03.200]. FIG. 2B shows the first and last cycles from FIG. 2A. It is evident that over the course of cycling, a resistive layer was built up between the lithium metal and the solid electrolyte since the overpotential (i.e. the distance from 0 mV to the potential plateau) grew.

In general, low, stable overpotentials during electrode cycling are desirable since a low overpotential translates to a higher cell discharge potential and thus to a higher energy density. Ideally, the overpotential of an electrode during cycling would be close to zero. A stable overpotential may be considered as indicative of a stable interphase between the lithium metal and the solid electrolyte. Thus, a stable overpotential is also desirable. FIG. 2 demonstrates the behavior of a 'natural' interphase, which consists of $Li_3P$, $Li_2S$ and lithium halides when lithium halide-doped lithium thiophosphate solid electrolyte is used. [Garcia-Mendez et al., DOI: 10.1016/j.electacta.2011.03.200]

The inventors have discovered that by prior application of an "artificial interphase" i.e. an interphase that would not be formed under normal cycling conditions, to the lithium metal electrode surface prior to construction of the cell resulted in significant and unexpected reduction in overpotential and significant and unexpected stability of overpotential during long term cycling could be obtained when evaluated according to the symmetric lithium cell test structure.

The inventors have discovered that by treatment of the lithium metal surface with an acid dissolved in a nonaqueous solvent, a surface layer which will function as an artificial interphase when the lithium metal is contacted with an electrolyte in construction of a cell is obtained.

The layer described as the artificial interphase layer in this disclosure is conductive of lithium ions but nonconductive of electrons. Having such conductivity character, the lithium electrode may be employed in contact with a liquid electrolyte or a solid electrolyte. In special embodiments described herein, the electrolyte may be a solid electrolyte.

As indicated in the example embodiments described herein the resulting artificial interphase supports stable lithium plating and stripping during the cycling performance of the solid state electrochemical cell.

The acid employed may be organic or inorganic and includes but is not limited to acids such as boric acid, sulfamic acid, ascorbic acid and 3-phosphonopropionic acid. In preferred embodiments, inorganic acids may be more effective in artificial interphase generation than organic acids. In one special embodiment, the treatment acid may be boric acid.

FIG. 13 shows a scanning electron microscopy image of a lithium foil surface treated with boric acid as a solution in dimethyl sulfoxide. The scanning electron microscopy (SEM) image shows formation of surface pitting present on the artificial interphase formed. The composition of the artificial interphase created with boric acid as determined by Energy-dispersive spectroscopy (EDS) shows the presence of boron, oxygen and sulfur atoms which are homogeneously dispersed across the surface, including the shallow pits. The inventors have noted that the surface seems to be primarily $BO_2$, although EDS cannot detect lithium and therefore, an exact composition may not be indicated by this data.

However, it may surmised that the effect of the acid treatment alters the chemical composition of the electrode surface and the artificial interphase formed significantly and unexpectedly improves the performance of a solid state electrochemical constructed with the electrode. FIGS. 8A to 10A show the average stripping and plating potentials of the cells are stable through cycling, and FIGS. 8B to 10B shows that the potential profiles do not change between the first and final cycles, which is indicative of a stable artificial interphase.

The solvent used for the acid treatment may be any nonaqueous solvent which dissolves the acid to the intended treatment concentration. Suitable treatment solvents may include but are not limited to dimethyl sulfoxide (DMSO), dimethyl formamide (DMF), ethers such as tetrahydrofuran (THF) and dioxane. Aprotic solvents may be employed according to embodiments of the disclosure.

The surface treatment may be conducted in any manner which effectively contacts the lithium metal surface with the dissolved acid. The acid solution may be sprayed onto the surface, applied by any conventional coating method or dip coated by placing the metal foil in an acid solvent bath.

Figures 14A, 14B, 14C:
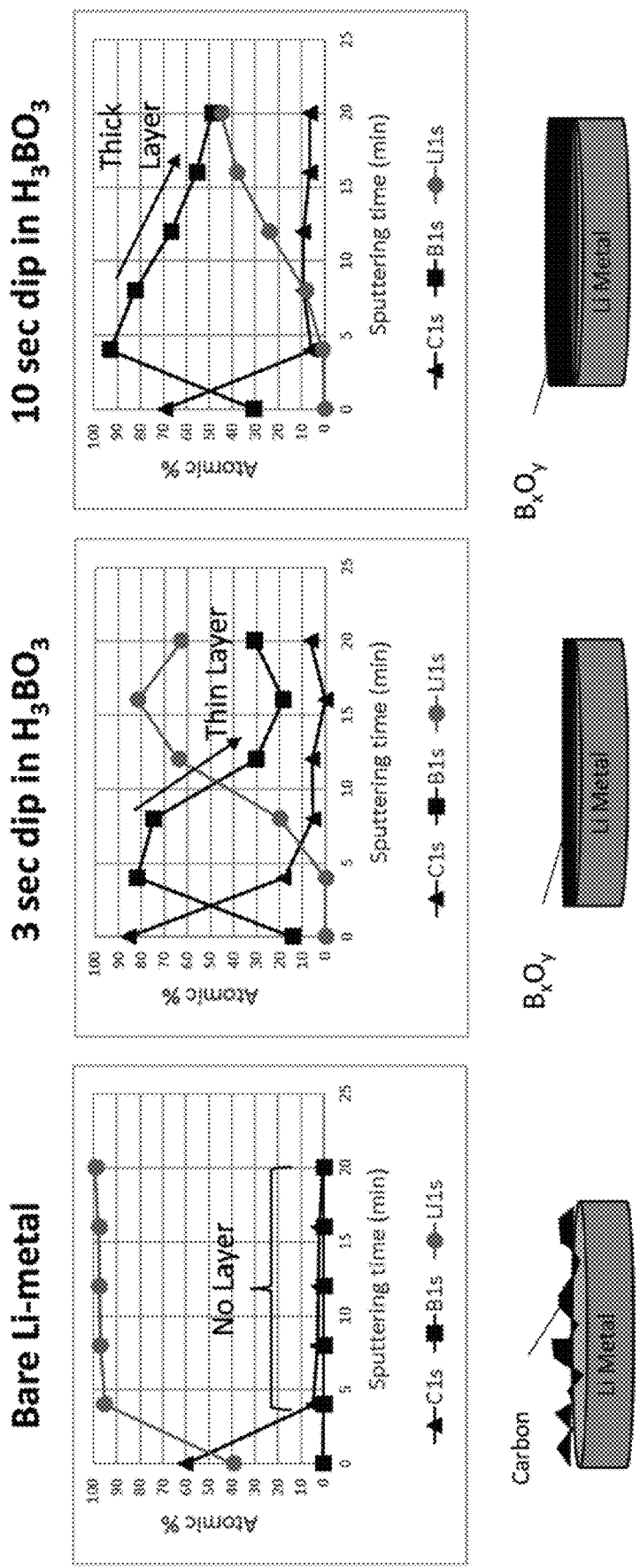
FIG. 14A shows the XPS analysis of "Bare Li-metal" not treated according to embodiments of this application.
FIG. 14B shows the XPS of a lithium metal sample after a 3 second dip in $H_3BO_3$.
FIG. 14C shows the XPS of a lithium metal sample after a 10 second dip in $H_3BO_3$.

FIG. 14 demonstrates the effect of dipping time of a dip coating method on the artificial interphase thickness using a boric acid DMSO solution for dipping times of 3 seconds and 10 seconds. The resulting surfaces were evaluated by sputtering, within an X-ray photoelectron spectroscopy (XPS) unit, to probe deeper into the surface layer. The lithium composition showed the relative depth of the surface layers between the untreated and treated samples. The longer dipping time creates a thicker artificial interphase.

Therefore, in certain embodiments the treatment method to form the artificial interphase may employ an acid solution as described above wherein the acid concentration is from 0.1 to 30 wt % and the treatment time may be from 1 second to 600 seconds. However, with variation in solvent and acid treatment times and acid concentration may be varied to achieve a target artificial interphase layer of target depth and composition.

Moreover, the inventors have determined that lithium metal treated according to the present embodiments shows an improved stability in air.

Thus, in a first embodiment, the present disclosure provides a lithium electrode of a lithium metal having a surface layer comprising salts and/or compounds resulting from reaction of lithium metal and an acid in a nonaqueous solvent.

The depth of the artificial interphase layer formed by the acid treatment is dependent upon the acid/solvent combination used, the concentration of the acid and the length of the treatment time. In one embodiment, the depth of the artificial interphase layer may be from 1 nm to 1000 nm, preferably 5 nm to 500 nm and most preferably from 10 to 250 nm.

In a second embodiment, the present disclosure provides an electrochemical cell, comprising: a lithium metal anode; a cathode capable of absorbing and release of lithium ions; and a non-aqueous electrolyte arranged between the lithium metal anode and the cathode; wherein an artificial interphase layer is located between the non-aqueous electrolyte and the lithium metal anode, and the artificial interphase layer comprises salts and/or compounds resulting from reaction of lithium metal and an acid dissolved in a nonaqueous solvent.

In an aspect of the second embodiment, a depth of the artificial interphase layer is from 1 nm to 1000 nm, preferably 5 nm to 500 nm and most preferably from 10 to 250 nm.

In another aspect of the second embodiment, the acid may be an organic acid or an inorganic acid and in a further aspect, the acid may be one selected from the group consisting of boric acid, sulfamic acid, ascorbic acid and 3-phosphonopropionic acid.

In third embodiment, the present disclosure provides a solid state electrochemical cell, comprising: a lithium metal anode; a cathode capable of absorbing and release of lithium ions; and a solid state electrolyte arranged between the lithium metal anode and the cathode; wherein an artificial interphase layer is located between the solid electrolyte and the lithium metal anode.

In an aspect of the third embodiment, a depth of the artificial interphase layer is from 1 nm to 1000 nm preferably 5 nm to 500 nm and most preferably from 10 to 250 nm.

In another aspect of the third embodiment, the acid is an organic acid or an inorganic acid and in a further aspect, the acid is one selected from the group consisting of boric acid, sulfamic acid, ascorbic acid and 3-phosphonopropionic acid.

Solid state electrochemical cells may be fabricated by pressing a cathode, solid electrolyte and anode together, with or without heat. A typical procedure may involve three steps: (1) pressing solid electrolyte powder into a pellet, (2) spreading cathode material over the solid electrolyte surface and then pressing the 'stack' again, before (3) spreading the anode material over the opposite side of the solid electrolyte and pressing the stack a third time.

The cathode may by any cathode known to one of skill in the art to be capable of insertion or intercalation of lithium ions upon discharge and release or de-intercalation of lithiums ions upon charge.

In a particular embodiment of the present disclosure, the cathode active material is elemental sulfur due to the potential advantages described previously.

The cathode may be prepared by conventional methods known to one of skill in the art. For example, elemental sulfur, carbon and a solid electrolyte may be combined in a mortar. A typical formulation may include 20-80 wt % elemental sulfur, 5-30% carbon and 2.0-50% solid electrolyte. The composite may be formed by mixing the components anywhere from 10 min to 1 h in the mortar to prepare a powder mixture and then ball milling the powder mixture for 1-7 days.

In another example procedure, the elemental sulfur, lithium sulfide, phosphorus pentasulfide and conductive carbon may be combined in a mortar and mixed for 10 min to 1 hour. The ratio of lithium sulfide to phosphorus pentasulfide may range from 2/1 to 4/1. The sulfur content may range from 20-80 wt % of the total composition. Then the mixture may be ball milled for 1-7 days.

Alternative chalcogenides to sulfur such as selenium and tellurium may also be employed as active cathode materials. Mixtures of any of these may also be employed.

Examples of conductive carbon include but are not limited to Ketjen black (carbon black), acetylene black, vapor grown carbon fiber, graphene, natural graphite, artificial graphite and activated carbon.

The cathode may be prepared by mixing the particles according to the above description with one or more binders and other materials conventionally employed to prepare a cathode structure. These materials may be mixed as a slurry, coated onto a metal foil, and dried. The methods of construction of a cathode employing an active material are conventionally known and any such method that is compatible with the particles of the disclosure may be employed.

Suitable binders known to one of ordinary skill which are chemically stable in the potential window of use of the cell may include thermoplastics and thermosetting resins. For example, polyethylene, polypropylene, polytetrafluoroethylene (PTFE), polyvinylidene fluoride (MAN), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper.

The solid state electrolyte may be any solid electrolyte permeable to lithium ions as known to one of skill in the art. The review by Manthiram previously referenced describes solid electrolytes which may be employed within the present disclosure. The acid treatment of the lithium electrode to serve as anode of the cell may be selected in view of the chemical composition of the solid electrolyte as the artificial interphase is composed of atoms not found in a natural interphase that may form. The effective treatment may be determined by experimentation as outlined in the present embodiments.

In a special embodiment the solid electrolyte may be a lithium thiophosphate solid electrolyte as previously described (Garcia-Mendez). In special embodiments, the lithium thiophosphate may be doped with lithium salts including but not limited to lithium salts such as LiBr, LiCl, LiBr, LiI, $Li_3N$, $Li_3P$, $Li_2O$, $Li_3BO_3$, or $LiBH_4$.

Figure 11A:
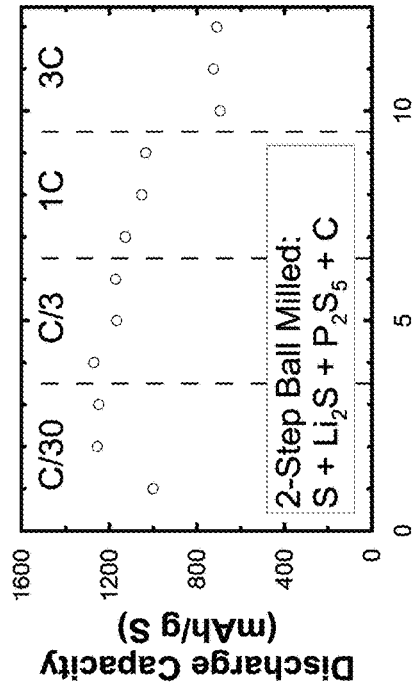
FIG. 11A shows the rate capability of a solid-state lithium sulfur cell with a positive electrode containing S. $Li_3PS_4$ and C with 1 ball mill step and a lithium metal negative electrode which was not treated according to the embodiments of the disclosure.
Figure 11B:
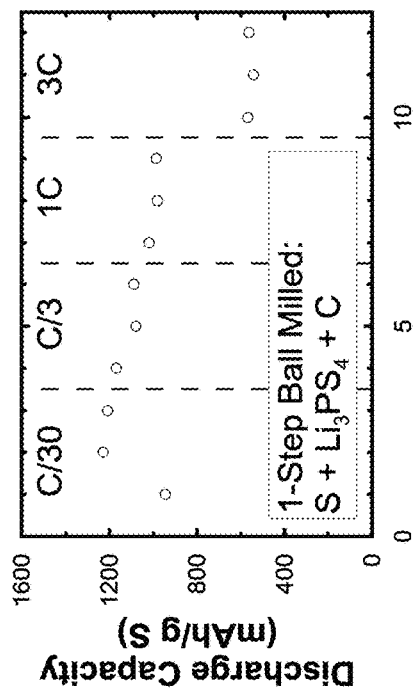
FIG. 11B shows the rate capability of a solid-state lithium sulfur cell with a positive electrode containing S, $Li_2S$, $P_2S_5$ and C with 2 ball mill steps and a lithium metal negative electrode which was not treated according to the embodiments of the disclosure.
Figure 11C:
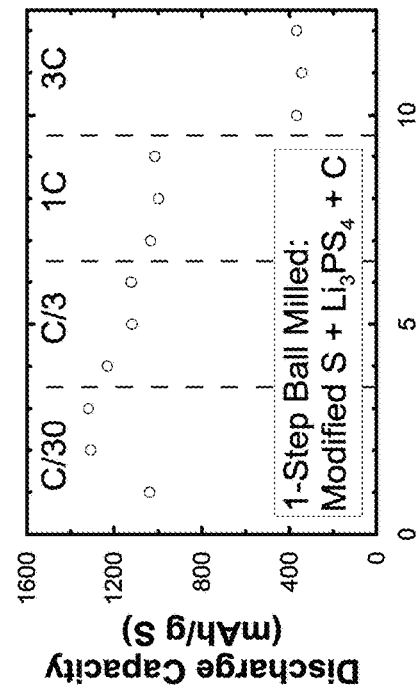
FIG. 11C shows the rate capability of a solid-state lithium sulfur cell with a positive electrode containing modified S, $Li_3PS_4$ and C with 1 ball mill step and a lithium metal negative electrode which was not treated according to the embodiments of the disclosure.
Figure 13B:
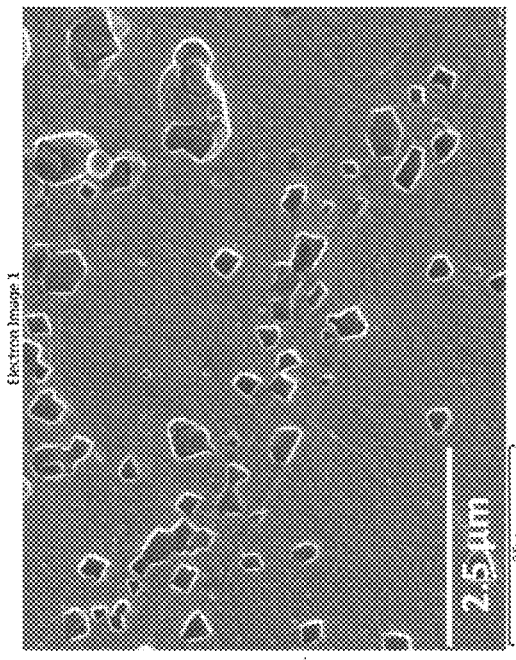
FIG. 13B shows an expanded image of the portion of FIG. 13A in the white square.
Figure 13D:
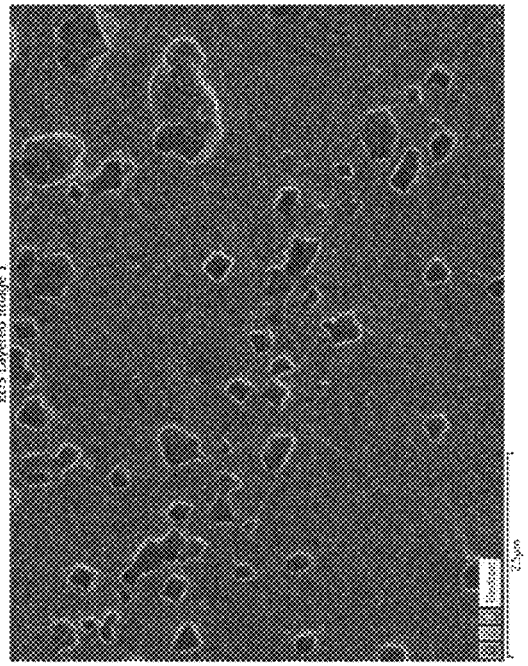
FIG. 13D shows a layered EDS image of the portion of FIG. 13A in the white square.
Figure 13A:
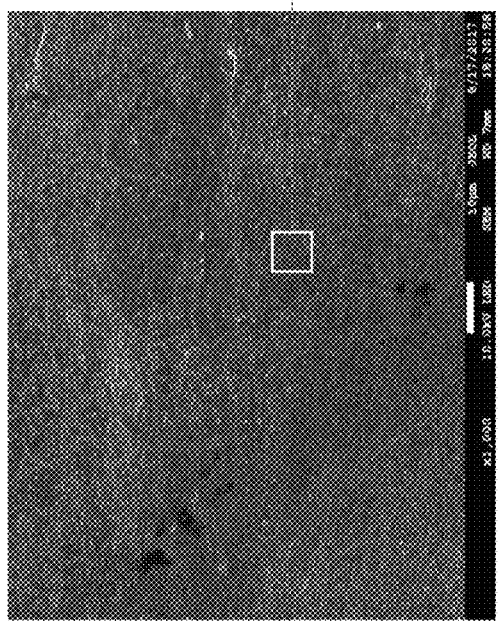
FIG. 13A shows the composition of the artificial interphase created with boric acid as determined by EDS.
Figure 13C:
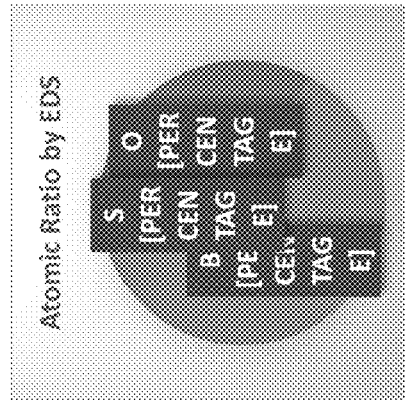
FIG. 13C shows atomic ratios by EDS.

FIG. 11 shows the rate capability of a solid-state lithium sulfur cell with positive electrodes made using conductive carbon, two different types of sulfur, and one or two ball milling steps to combine the components. The lithium metal negative electrode was not treated prior to use and therefore, is representative of the current state of the art in this technology. All three cells perform similarly, delivering nearly equal discharge capacities up to a 1C rate.

FIG. 12 shows the cycling behavior of the same positive electrodes and ball milling methods described in FIG. 11, except that the lithium negative electrode was treated with boric acid according to the present disclosure prior to testing. The discharge capacity is highest in FIG. 12B, when commercial carbon is mixed with the components of the solid electrolyte in two ball milling steps. Of greater importance is the sustained discharge capacity of about 3 mAh/cm$^2$ with a lithium metal negative electrode. The boric acid treatment and resulting artificial interphase according to the present disclosure supports a high degree stable lithium plating and stripping which was unexpectedly superior to that of FIG. 11. The inventors believe that this sustained discharge capacity of 3 mAh/cm$^2$ is the highest performance reported for a solid state lithium sulfur cell to date.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, these embodiments are not intended to be limited to the examples shown, but are to be accorded the widest scope consistent with the principles and features disclosed herein. In this regard, certain embodiments within the invention may not show every benefit of the invention, considered broadly.

EXPERIMENTAL

Example 1

Preparation of a Lithium-sulfur solid state electrochemical cell: A sulfur/solid electrolyte/lithium cell was fabricated as follows. First, 80 to 300 mg of lithium iodide-doped lithium thiophosphate was cold-pressed into a 1.128 cm diameter pellet using 0.5 to 10 tons of pressure. Then, 1 to 300 mg of a mixture of sulfur, carbon and lithium halide-doped lithium thiophosphate was spread atop the solid electrolyte pellet and the stack was pressed again with 0.1 to 6 tons of pressure. Finally, lithium foil was placed against the opposing side of the solid electrolyte, followed by copper foil to act as a current collector, and the stack was pressed at 0 to 4 tons of pressure.

Galvanic Testing of Treated Lithium Electrodes

Artificial interphases on lithium metal were mainly tested by galvanostatically cycling so-called symmetric lithium cells where lithium metal was used as both the positive and negative electrodes. FIG. 1 shows a schematic of the cell design and assembly. First, the solid electrolyte powder was pressed into a pellet. Then the pistons were removed and lithium disks were slipped into the cell on both sides of the pellet, before replacing the pistons and applying light pressure to them. A few conditioning cycles at a low rate were performed on fresh cells before they were subjected to long term cycling.

FIG. 2A shows the long term cycling of a Li—Li symmetric cell using lithium iodide-doped lithium thiophosphate solid electrolyte. The lithium metal electrodes were not treated prior to testing. The stripping and plating potentials are not stable through cycling, similar to reports from the literature [Garcia-Mendez et al., DOI: 10.1016/j.electacta.2017.03.200]. FIG. 2B shows the first and last cycles from FIG. 2A. It is evident that over the course of cycling, a resistive layer built up between the lithium metal and the solid electrolyte since the overpotential (i.e. the distance from 0 mV to the potential plateau) grew.

In general, low, stable overpotentials during electrode cycling are desirable since a low overpotential translates to a higher cell discharge potential and thus to a higher energy density. Ideally, the overpotential of an electrode during cycling would be close to zero. A stable overpotential is indicative of a stable interphase between the lithium metal and the solid electrolyte. Thus, a stable overpotential is also desirable. FIG. 2 demonstrates the behavior of a 'natural' interphase, which consists of $Li_3P$, $Li_2S$ and lithium halides when lithium halide-doped lithium thiophosphate solid electrolyte is used, [Garcia-Mendez et al., DOI: 10.1016/j.electacta.2017.03.200].

Figure 3B:
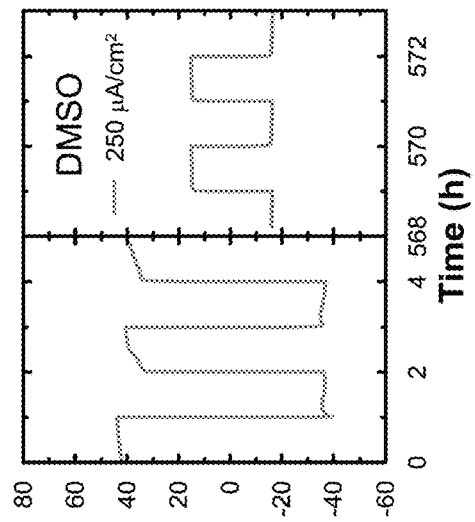
FIG. 3B shows the first and last cycles from FIG. 3A.
Figure 3A:
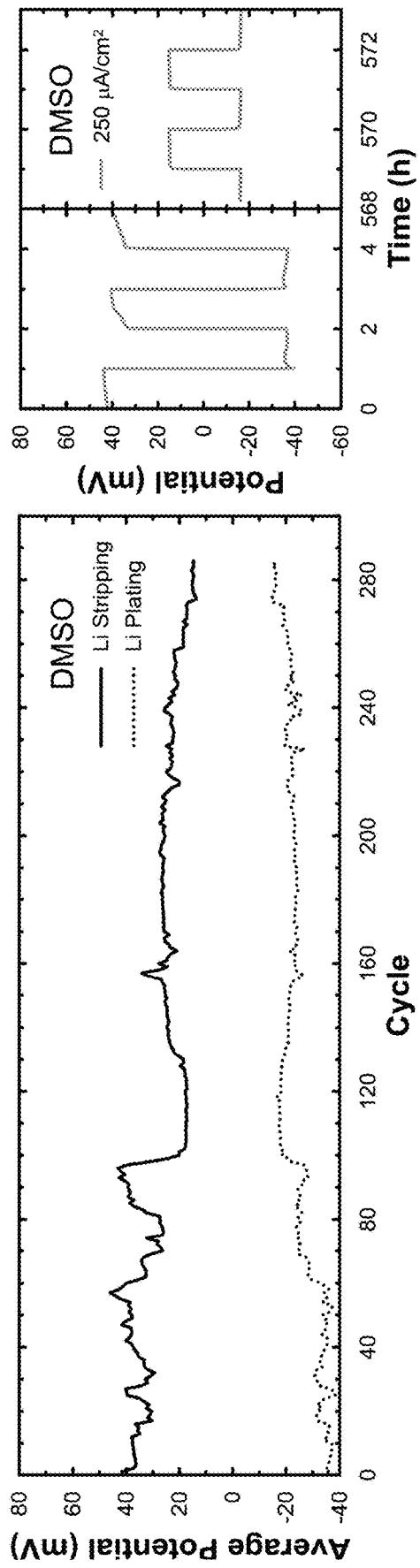
FIG. 3A shows the long term cycling of a Li—Li symmetric cell using lithium iodide-doped lithium thiophosphate solid electrolyte and lithium metal electrodes which were treated with pure DMSO solvent.

FIG. 3A shows the long term cycling of a Li—Li symmetric cell using lithium iodide-doped lithium thiophosphate solid electrolyte. The lithium metal electrodes were treated with pure DMSO solvent prior to testing. The stripping and plating potentials were not stable through cycling, suggesting an unstable artificial interphase. FIG. 3B shows the first and last cycles from panel FIG. 3A. It is evident that over the course of cycling, a less-resistive layer built up between the lithium metal and the solid electrolyte since the overpotential shrank.

FIG. 4A shows the long term cycling of a symmetric cell using lithium iodide-doped lithium thiophosphate solid electrolyte. The lithium metal electrodes were treated with boric acid in DMSO solvent prior to testing. The stripping and plating potentials are very stable through cycling, suggesting a stable artificial interphase. The overpotential is also low at about 10 mV at 250 µA/cm$^2$. FIG. 4B shows the first and last cycles from FIG. 4A. It is evident that over the course of cycling, little changed between the lithium metal and the solid electrolyte.

Figure 5B:
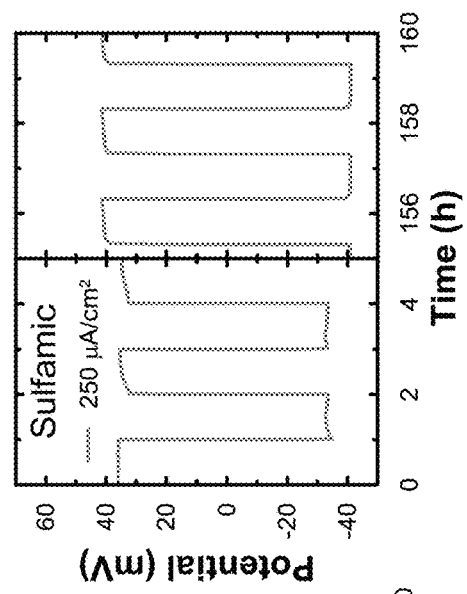
FIG. 5B shows the first and last cycles from FIG. 5A.
Figure 5A:
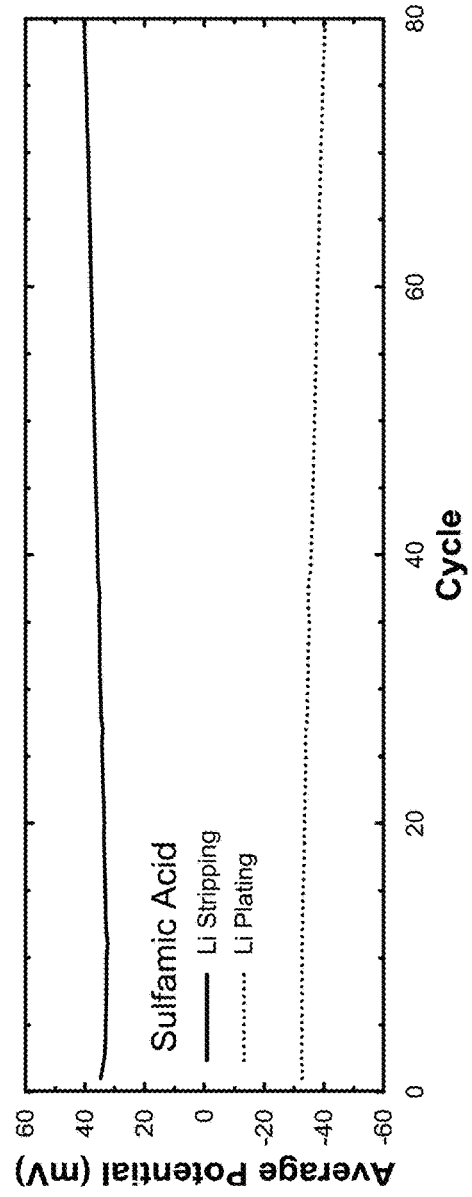
FIG. 5A shows the long term cycling of a Li—Li symmetric cell using lithium iodide-doped lithium thiophosphate solid electrolyte and lithium metal electrodes which were treated with sulfamic acid in DMSO solvent according to one embodiment.

FIG. 5A shows the long term cycling of a Li—Li symmetric cell using lithium iodide-doped lithium thiophosphate solid electrolyte. The lithium metal electrodes were treated with sulfamic acid in DMSO solvent prior to testing. The stripping and plating potentials were fairly stable through cycling, suggesting a stable artificial interphase. The overpotential was about 40 mV at 250 µA/cm$^2$, which is notably higher than that in FIG. 4, signifying a higher resistance interphase. FIG. 5B shows the first and last cycles from FIG. 5A. Since the overpotential did not change over cycling, the interphase is relatively stable.

Figure 6B:
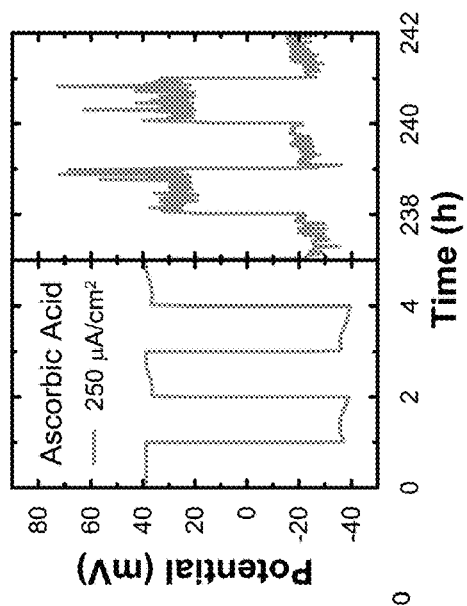
FIG. 6B shows the first and last cycles from FIG. 6A.
Figure 6A:
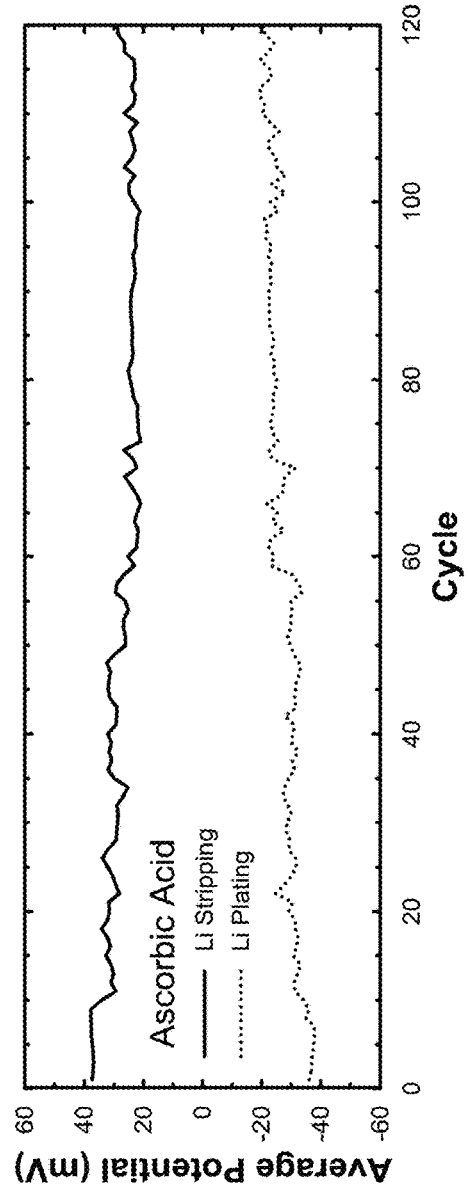
FIG. 6A shows the long term cycling of a Li—Li symmetric cell using lithium iodide-doped lithium thiophosphate solid electrolyte and lithium metal electrodes which were treated with ascorbic acid in DMSO solvent according to one embodiment.

FIG. 6A shows the long term cycling of a Li—Li symmetric cell using lithium iodide-doped lithium thiophosphate solid electrolyte. The lithium metal electrodes were treated with ascorbic acid in DMSO solvent prior to testing. The stripping and plating potentials were very unstable through cycling, suggesting an unstable artificial interphase. FIG. 6B shows the first and last cycles from FIG. 6A. The interphase was quite unstable after 120 cycles.

FIG. 7A shows the long term cycling of a Li—Li symmetric cell using lithium iodide-doped lithium thiophosphate solid electrolyte. The lithium metal electrodes were treated with 3-phosphonopropionic acid in DMSO solvent prior to testing. The average stripping and plating potentials were stable through cycling. FIG. 7B shows that the potential profile changes between the first and final cycles. The identical profile in sequential cycles shown suggests that a reversible process occurs in the interphase.

Figure 8B:
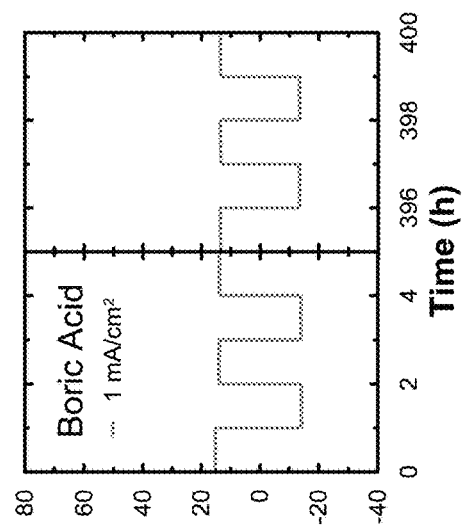
FIG. 8B shows the potential profiles of the first and final cycles of FIG. 8A.
Figure 8A:
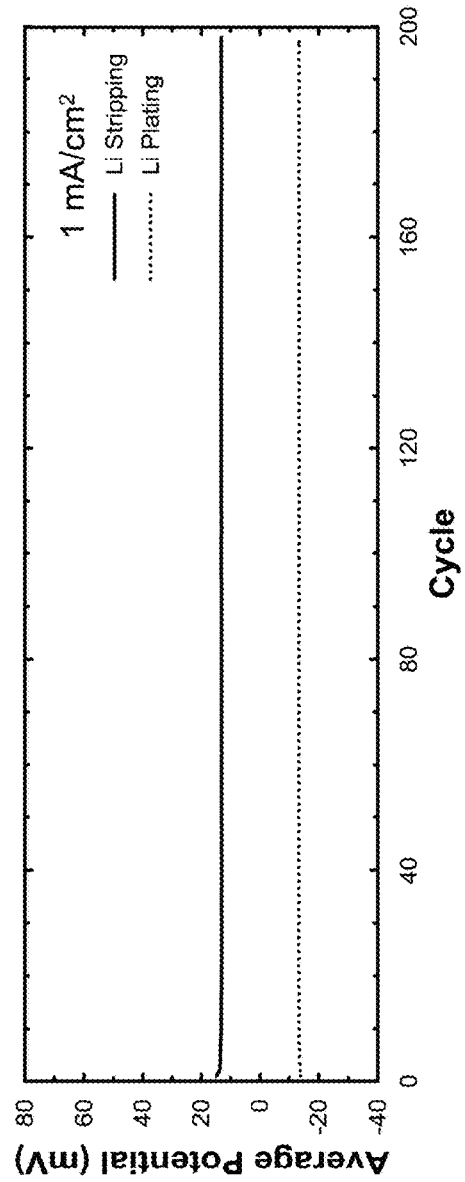
FIG. 8A shows the long term cycling at 1 $mA/cm^2$ of a Li—Li symmetric cell using lithium-iodide doped lithium thiophosphate solid electrolyte and lithium metal electrodes which were treated with boric acid in DMSO solvent according to one embodiment.

FIG. 8A shows the long term cycling of a Li—Li symmetric cell using lithium iodide-doped lithium thiophosphate solid electrolyte at 1 mA/cm$^2$. The lithium electrodes were treated with boric acid in DMSO solvent prior to testing. The average stripping and plating potentials are stable through cycling, and FIG. 8B shows that the potential profiles do not change between the first and final cycles, which are indicative of a stable artificial interphase.

FIG. 9A shows the long term cycling of a Li—Li symmetric cell using lithium iodide-doped lithium thiophosphate solid electrolyte at 2 mA/cm$^2$. The lithium metal electrodes were treated with boric acid in DMSO solvent prior to testing. The average stripping and plating potentials are stable through cycling, and FIG. 9B shows that the potential profiles do not change between the first and final cycles, which are indicative of a stable artificial interphase.

Figure 10B:
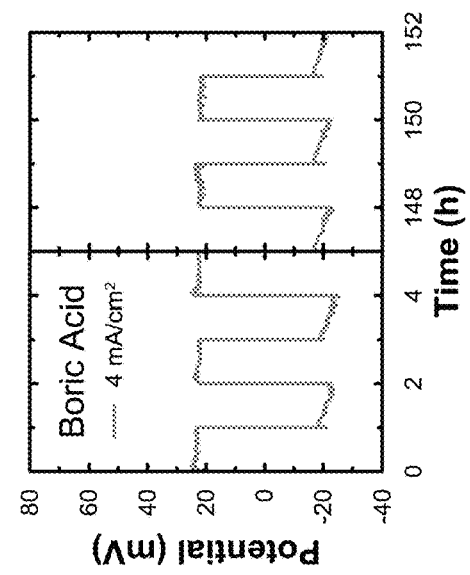
FIG. 10B shows the potential profiles of the first and final cycles of FIG. 10A.
Figure 10A:
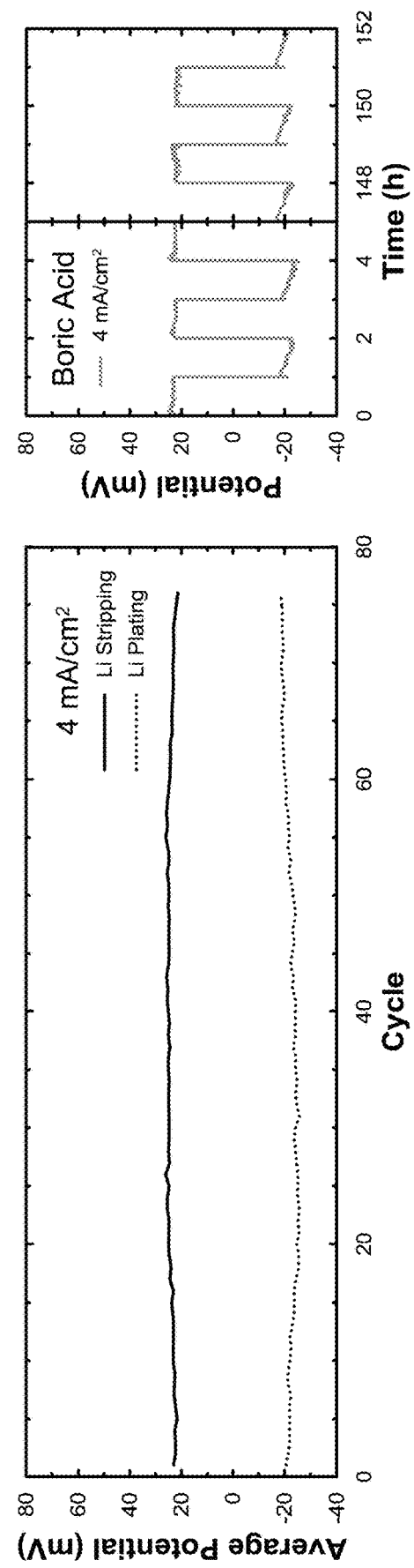
FIG. 10A shows the long term cycling at 4 m $A/cm^2$ of a Li—Li symmetric cell using lithium iodide-doped lithium thiophosphate solid electrolyte and lithium metal electrodes which were treated with boric acid in DMSO solvent according to one embodiment.

FIG. 10A shows the long-term cycling of a Li—Li symmetric cell using lithium iodide-doped lithium thiophosphate solid electrolyte at 1 mA/cm$^2$. The lithium metal electrodes were treated with boric acid in DMSO solvent prior to testing. The average stripping and plating potentials were stable through cycling, and FIG. 10B shows that the potential profiles do not change between the first and final cycles, which are indicative of a stable artificial interphase.

FIG. 11 shows the rate capability of a solid-state lithium sulfur cell with positive electrodes made using conductive carbon, two different types of sulfur, and one or two ball milling steps to combine the components. The lithium metal negative electrode was not treated prior to use. All three cells perform similarly, delivering nearly equal discharge capacities up to a IC rate.

FIG. 2 shows the cycling behavior of the same positive electrodes and ball milling methods described in FIG. 11, except that the lithium negative electrode was treated with boric acid prior to testing. The discharge capacity is highest in FIG. 12B, when commercial carbon is mixed with the components of the solid electrolyte in two ball milling steps. Of greater importance is the sustained discharge capacity of about 3 mAh/cm$^2$ with a lithium metal negative electrode. The boric acid treatment and resulting artificial interphase supports stable lithium plating and stripping. The inventors believe that this sustained discharge capacity of 3 mAh/cm$^2$ is the highest performance reported for a solid state lithium sulfur cell to date.

FIG. 13 shows the composition of the artificial interphase created with boric acid as determined by EDS. The boron, oxygen and sulfur are homogeneously dispersed across the surface, including the shallow pits. The surface seems to be primarily $BO_2$, although EDS cannot detect lithium.

FIG. 14 demonstrates the effect of dipping time on the interphase thickness. Boric acid was used as an example treatment solution. Sputtering, within the XPS machine, was used to probe deeper into the surface layer. The lithium composition reveals the relative depth of the surface layers between the three samples, with a longer dipping time creating a thicker artificial interphase.

As understood by one of skill in the art, the electrochemical cells according to the embodiments described herein may be constructed into a formal battery structure comprising ancillary structure such as casing and terminal leads, wherein one or a plurality of electrochemical cell according to the embodiments described herein are included. These batteries may be designed for utility to power electronic equipment such as but not limited to mobile phones, computers and gaming devices. Further, batteries designed to power larger units such as vehicles may be produced with one or a plurality of electrochemical cell according to the embodiments described herein. Utilities for the high capacity lithium cells according to the present disclosure may be readily envisioned by one of skill in the art.

The advantages of the present disclosure may be realized and obtained as particularly pointed out in the appended claims. As will be realized, the present disclosure is capable of other and different embodiments, and its several details are capable of modifications in various obvious respects, all without departing from the present disclosure. In this regard, the description herein is to be understood as illustrative in nature, and not as restrictive.

The invention claimed is:

1. A solid state electrochemical cell, comprising:
a lithium metal anode;
a cathode capable of absorbing and release of lithium ions; and
a solid state electrolyte arranged between the lithium metal anode and the cathode;
wherein
the lithium metal anode comprises an artificial interphase layer on the surface of the lithium metal anode which contacts the solid state electrolyte,
the artificial interphase layer comprises lithium salts and/or compounds resulting from contacting the lithium metal anode with an acid dissolved in a nonaqueous solvent,
the lithium salts and/or compounds are derived from reaction of the lithium metal anode with the acid dissolved in a nonaqueous solvent,
the acid dissolved in a nonaqueous solvent contacted with the lithium metal to obtain the artificial interphase layer is one selected from the group consisting of boric acid, sulfamic acid, and 3-phosphonopropionic acid, and
the artificial interphase layer conducts lithium ions and is nonconductive or electrons.

2. The solid state electrochemical cell according to claim 1, wherein a depth of the artificial interphase layer on the lithium metal anode is from 1 nm to 1000 nm.

3. The solid state electrochemical cell according to claim 1,
wherein the cathode capable of absorbing and release of lithium ions comprises elemental sulfur.

4. The solid state electrochemical cell according to claim 1,
wherein the solid electrolyte is a lithium thiophosphate solid electrolyte.

5. The solid state electrochemical cell according to claim 4,
wherein the lithium thiophosphate may be doped with a lithium salt selected from the group consisting of LiF, LiCl, LiBr, LiI, $Li_3N$, $Li_3P$, $Li_2O$, $Li_3BO_3$ and $LiBH_4$.

6. The solid state electrochemical cell according to claim 3,
wherein the cathode further comprises selenium and/or tellurium.

7. An electrochemical cell, comprising:
a lithium metal anode;
a cathode capable of absorbing and release of lithium ions; and
a non-aqueous electrolyte arranged between the lithium metal anode and the cathode;
wherein
the lithium metal anode comprises an artificial interphase layer on the surface of the lithium metal anode which contacts the non-aqueous electrolyte,
the artificial interphase layer comprises lithium salts and/or compounds resulting from contacting the lithium metal anode with an acid dissolved in a nonaqueous solvent, the lithium salts and/or compounds are derived from reaction of the lithium metal anode with the acid dissolved in a nonaqueous solvent, the acid dissolved in a nonaqueous solvent contacted with the lithium metal to obtain the artificial interphase layer is one selected from the group consisting of boric acid, sulfamic acid, and 3-phosphonopropionic acid, and the artificial interphase layer conducts lithium ions and is nonconductive of electrons.

8. The electrochemical cell according to claim 7, wherein a depth of the artificial interphase layer on the lithium metal anode is from 1 nm to 1000 nm.

9. A lithium electrode, comprising:
a lithium metal; and
an artificial interphase layer on a surface of the lithium metal;
wherein
the artificial interphase layer contacts a liquid electrolyte or a solid electrolyte and comprises the lithium metal and lithium salts and/or compounds obtained by contacting the lithium metal with an acid dissolved in a nonaqueous solvent,
the lithium salts and/or compounds are derived from reaction of the lithium metal with the acid dissolved in a nonaqueous solvent,
the artificial interphase layer conducts lithium ions and is nonconductive of electrons, and
the acid dissolved in a nonaqueous solvent contacted with the lithium metal to obtain the artificial interphase layer is one selected from the group consisting of boric acid, sulfamic acid, and 3-phosphonopropionic acid.

10. The lithium electrode according to claim 9, wherein a depth of the artificial interphase layer is from 1 nm to 1000 nm.

11. A method to prepare a lithium metal electrode having an artificial interphase layer according to claim 9, comprising:
treating a surface of the lithium metal with an acid dissolved in a nonaqueous solvent for a length of time; and
drying the treated electrode of the nonaqueous solvent to obtain the lithium metal electrode having an artificial interphase layer,
wherein
the acid dissolved in a nonaqueous solvent contacted with the lithium metal to obtain the artificial interphase layer is one selected from the group consisting of boric acid, sulfamic acid, and 3-phosphonopropionic acid, and
the artificial interphase layer conducts lithium ions and is nonconductive of electrons.

12. The method to prepare a lithium metal electrode having an artificial interphase layer, according to claim 11, wherein a treatment time of the lithium metal to the acid solution is from 1 second to 600 seconds.

13. The method to prepare a lithium metal electrode having an artificial interphase layer, according to claim 11, wherein an acid concentration in the nonaqueous solvent is from 0.1 to 30 wt % of the composition.

* * * * *